Patented Sept. 2, 1924.

1,507,328

UNITED STATES PATENT OFFICE.

SUREN H. BABIGIAN AND BERGE BABIGIAN, OF BERKELEY, CALIFORNIA; SAID BERGE BABIGIAN ASSIGNOR TO SAID SUREN H. BABIGIAN.

FOOD PRODUCT AND METHOD OF PRODUCTION.

No Drawing.   Application filed March 4, 1922.   Serial No. 541,213.

*To all whom it may concern:*

Be it known that we, SUREN H. BABIGIAN and BERGE BABIGIAN, citizens of Armenia, residing at Berkeley, in the county of Alameda and State of California, have invented new and useful Improvements in Food Products and Methods of Production, of which the following is a specification.

This invention relates to food products and their method of production.

It is the principal object of the present invention to provide a method of treating and preparing food products so that they may be preserved for use in either a syrup, a candied condition, or without the addition of any sugar, and so that their original flavor, color, and taste will be retained.

The present invention contemplates a method of first solidifying and giving a firm body structure to fruit, vegetables, nuts and melons, and thereafter treating the product so that it may keep without spoiling, and its original physical characteristics will be preserved.

This process has been found equally applicable to fruit, vegetables, melons, and in some instances, nuts. Broadly considered the process consists in first preparing the product, thereafter washing it in cold water to clean it, then soaking it in a solution of lime and water to render the fiber and tissue structure more firm and permanent, then rewashing the product to relieve it of the lime solution, at the same time treating it with a chemical to neutralize any of the lime solution which might have been retained in the encrusted surface of the product, and to further solidify the structure of the product, after which the product may be sterilized in water or treated with a sugar solution either to sterilize it or to candy and preserve it.

The lime solution comprises slack or quick lime mixed with water and in fact medicinal lime water may be used if desired. The agent for neutralizing the lime solution, and for producing an astringent action, is preferably a sulphate such as potassium sulphate, although it has been found that tartaric acid and citric acid as well as other weak acids or acid salts may satisfactorily be used.

Considering a typical product we may prepare pumpkin by first peeling it and cutting it into any desired sizes or shapes of pieces, after which the pumpkin is subjected to a solidifying action by soaking in lime water until it has become suitably solidified and encrusted with a hardened outer surface. This treatment may require from ten to twelve hours and it has been found preferable to soak the products in the lime water over night. When this has been properly done the product is then repeatedly washed with pure, cold water until clean. The neutralizing and astringent solution such as the acid or sulphate is then prepared by boiling, after which the previously treated product is placed in the already boiling solution and left for ten or twenty minutes. The product is then removed and again washed with cold water. The boiling is then resumed in an already boiling weak sugar solution. This sugar solution will tend to remove any trace of the neutralizing and astringent agent and will treat the product to restore its flavor and to prevent any chemical taste from either the quick lime or the sulphate. The product is then repeatedly washed in pure, cold water, to clear it of the sugar solution. At this step of the process it may be desirable to merely sterilize the product, as when preparing vegetables, and not preserve it in a syrup or prepare it for candying. This may be done, of course, by boiling in water under a suitable temperature.

If it is desired to preserve the product in sugar it is then cooked in a strong solution of sugar for about a half hour, after which flavoring or coloring matter may be added, and the product then packed in syrup and sealed until required.

In the event that the product is to be candied, it is removed after cooking in a strong sugar solution and allowed to dry when it may be used or packed as required.

After carrying out this process it has been found that all of the original characteristics of the product have been preserved including the color, texture of the product, the flavor and all other physical characteristics.

It has also been found that nuts may be treated in a similar manner, and that a very delicious product may be obtained, as, for example, green walnuts may be taken when the outer shells of the nuts are green and soft and the meat of the nut is still in a semi-solid condition. The outer shell is peeled off, and this meat is then removed and soaked in pure water several hours. The water is changed frequently until the meat of the nuts has lost all its bitter flavor and astringent tendencies. The nuts are then treated in the same manner as indicated for pumpkins and the final product obtained.

Various vegetables and fruits may also be treated in this manner, and in each instance the original physical characteristics of the product will be retained while the product will be preserved.

It will thus be seen that the process here disclosed provides a method of treating food products and retaining their physical characteristics, at the same time making it possible for them to be used in a sterile, candied or preserved condition.

While we have shown the preferred steps in our process it will be understood that various changes might be made in arrangement by those skilled in the art, without departing from the spirit of the invention as claimed.

Having thus described our invention, what we claim and desire to secure by Letters Patent, is:

1. A method of preserving fruits, vegetables and the like, which consists in treating them with a lime solution over a period of hours to partially harden the fiber of the fruit and to thereafter treat the fruit with a neutralizing and astringent agent to neutralize the lime and to produce an astringent action upon the fibers whereby the original shape and solidity of the fruit will be preserved.

2. A method of preserving fruits, vegetables and the like which consists in first soaking them in a solution of lime over a period of hours, whereby the complete mass of the fruit will be permeated by the solution, thereafter treating the fruit to neutralize the lime and to create an astringent action on the fibers and then washing the fruit thus treated.

3. A method of treating fruit, vegetables and the like, which consists in first soaking them in a lime solution until the entire mass has been permeated, thereafter washing the articles; then soaking them in a neutralizing and astringent solution at boiling temperature, and then washing the articles thus treated.

4. A method of treating fruit, vegetables and the like, which consists in first soaking them in a lime solution until the entire mass has been permeated, thereafter washing the articles; then soaking them in a neutralizing and astringent solution at boiling temperature; then washing the articles thus treated; and then boiling the articles in a weak sugar solution.

5. A method of preserving fruit which consists in first treating the fruit by soaking it for a period of hours in a lime solution, thereafter soaking the fruit in a neutralizing and astringent solution at boiling temperature, then washing the fruit, thereafter boiling it in a strong sugar solution to preserve or glaze it.

SUREN H. BABIGIAN.
BERGE BABIGIAN.